United States Patent
Choo et al.

(10) Patent No.: US 10,056,633 B2
(45) Date of Patent: Aug. 21, 2018

(54) PERFORMANCE RECOVERY METHOD FOR FUEL CELL STACK

(71) Applicant: Hyundai Motor Company, Seoul (KR)

(72) Inventors: Hyun Suk Choo, Yongin (KR); Dae Keun Chun, Seoul (KR); Hwan Soo Shin, Uiwang (KR); Sung Keun Lee, Suwon (KR); Jae Hyuk Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 508 days.

(21) Appl. No.: 14/141,899

(22) Filed: Dec. 27, 2013

(65) Prior Publication Data

US 2015/0104721 A1 Apr. 16, 2015

(30) Foreign Application Priority Data

Oct. 14, 2013 (KR) .................. 10-2013-0121827
Nov. 29, 2013 (KR) .................. 10-2013-0146740

(51) Int. Cl.

| | |
|---|---|
| *H01M 8/06* | (2016.01) |
| *H01M 8/04* | (2016.01) |
| *H01M 4/90* | (2006.01) |
| *H01M 8/0662* | (2016.01) |
| *H01M 4/92* | (2006.01) |
| *H01M 8/04223* | (2016.01) |
| *H01M 8/1018* | (2016.01) |

(52) U.S. Cl.
CPC ......... *H01M 8/0662* (2013.01); *H01M 4/92* (2013.01); *H01M 4/926* (2013.01); *H01M 8/04238* (2013.01); *H01M 2008/1095* (2013.01); *H01M 2220/20* (2013.01); *H01M 2250/20* (2013.01); *Y02T 90/32* (2013.01)

(58) Field of Classification Search
CPC .. H01M 8/0662; H01M 8/04238; H01M 8/04; H01M 4/926
USPC .................................. 429/408–451
See application file for complete search history.

(56) References Cited

U.S. PATENT DOCUMENTS

| | | | |
|---|---|---|---|
| 8,067,123 B2 * | 11/2011 | Kumada ........... | H01M 8/04238 429/429 |
| 2004/0001980 A1 * | 1/2004 | Balliet .............. | H01M 8/04231 429/429 |
| 2006/0188765 A1 * | 8/2006 | Matsuzaki ........ | H01M 8/04559 429/429 |
| 2009/0035630 A1 | 2/2009 | Kumada et al. | |

(Continued)

FOREIGN PATENT DOCUMENTS

| | | |
|---|---|---|
| CN | 1825673 A | 8/2006 |
| CN | 101582513 A | 11/2009 |

(Continued)

*Primary Examiner* — Kenneth J Douyette
(74) *Attorney, Agent, or Firm* — Mintz Levin Cohn Ferris Glovsky and Popeo, P.C.; Peter F. Corless (57) ABSTRACT

A method for recovering the performance of a fuel cell stack mounted within a vehicle is provided. A method includes a recovery process of continuously applying a predetermined load using a load device when an air supply is stopped and hydrogen is supplied to a fuel cell stack to output current from the fuel cell stack. Further, protons and electrons generated by hydrogen oxidation reaction at an anode are moved to a cathode, to produce hydrogen at the cathode and simultaneously remove oxide on the catalyst surface of the cathode.

8 Claims, 10 Drawing Sheets

(56) References Cited

U.S. PATENT DOCUMENTS

| | | | | |
|---|---|---|---|---|
| 2009/0117418 A1* | 5/2009 | Obata | ............... | H01M 8/04186 |
| | | | | 429/433 |
| 2009/0286112 A1 | 11/2009 | Oh et al. | | |
| 2011/0008686 A1* | 1/2011 | Gould | ............... | H01M 8/04544 |
| | | | | 429/400 |
| 2011/0076524 A1* | 3/2011 | Takamori | .......... | H01M 8/04559 |
| | | | | 429/9 |
| 2011/0143241 A1* | 6/2011 | Tighe | ................ | H01M 8/04231 |
| | | | | 429/428 |

FOREIGN PATENT DOCUMENTS

| | | | |
|---|---|---|---|
| CN | 102270766 A | 12/2011 | |
| JP | 2006-085959 A | 3/2006 | |
| JP | 2006-236739 A | 7/2006 | |
| JP | 2007-053020 A | 3/2007 | |
| JP | 2008-235093 A | 10/2008 | |
| JP | 2009-037770 A | 2/2009 | |
| JP | 2009-277637 A | 11/2009 | |
| KR | 10-2007-0044628 A | 4/2007 | |
| KR | 10-2007-0095684 A | 10/2007 | |
| KR | 10-2009-0043962 A | 5/2009 | |
| KR | 10-2009-0119069 A | 11/2009 | |
| KR | 10-1405551 B1 | 6/2014 | |
| WO | 2007/010834 A1 | 1/2007 | |

* cited by examiner

PERFORMANCE RECOVERY METHOD FOR FUEL CELL STACK

CROSS-REFERENCE TO RELATED APPLICATIONS

This application claims priority under 35 U.S.C. § 119 to Korean Patent Application No. 10-2013-0121827 filed on Oct. 14, 2013 and Korean Patent Application No. 10-2013-0146740 filed on Nov. 29, 2013 in the Korean Intellectual Property Office, the disclosure of which is incorporated herein by reference in its entirety.

BACKGROUND (a) Technical Field

The present invention relates to a method for recovering the performance of a fuel cell stack. More particularly, the present invention relates to a method for directly recovering the deteriorated performance of a fuel cell stack mounted within a vehicle without detachment of the fuel cell stack.

(b) Background Art

Figure 2:
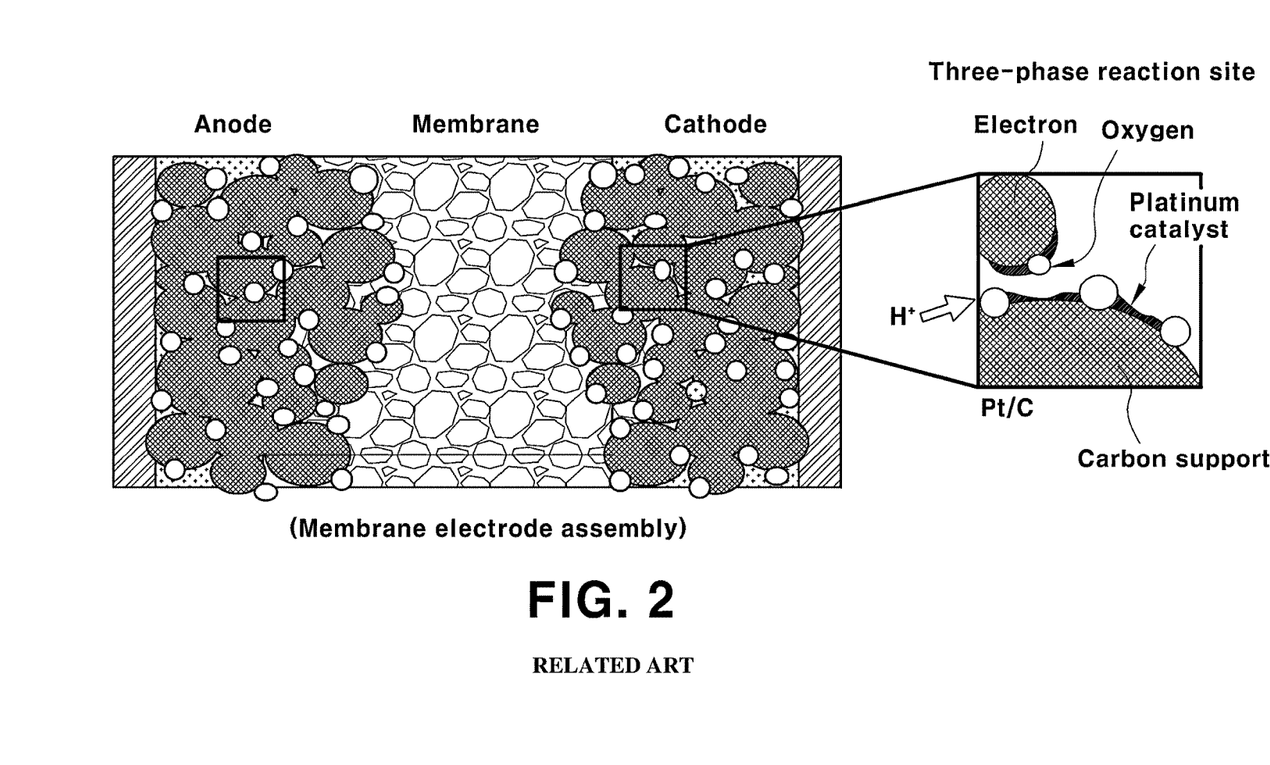
FIG. 2 is an exemplary membrane electrode assembly of a fuel cell according to the related art.

A fuel cell stack is used in a fuel cell vehicle as a main power source and is formed of tens to hundreds of stacked unit cells. FIG. 2 schematically shows an exemplary basic configuration of a membrane electrode assembly (MEA) in a unit cell of a fuel cell stack. As shown in the figure, the membrane electrode assembly is disposed at the innermost side of the unit cell of the fuel cell stack.

The membrane electrode assembly includes a polymer electrolyte membrane 10 that conducts protons and an anode 14 and a cathode 12 as electrodes stacked on either side of the electrolyte membrane to allow hydrogen as a fuel gas and oxygen as an oxidizing gas to react. The anode 14 and the cathode 12 are formed of platinum (Pt), a catalytic material, supported on carbon, i.e. a Pt/C catalyst electrode layer.

Figure 1:
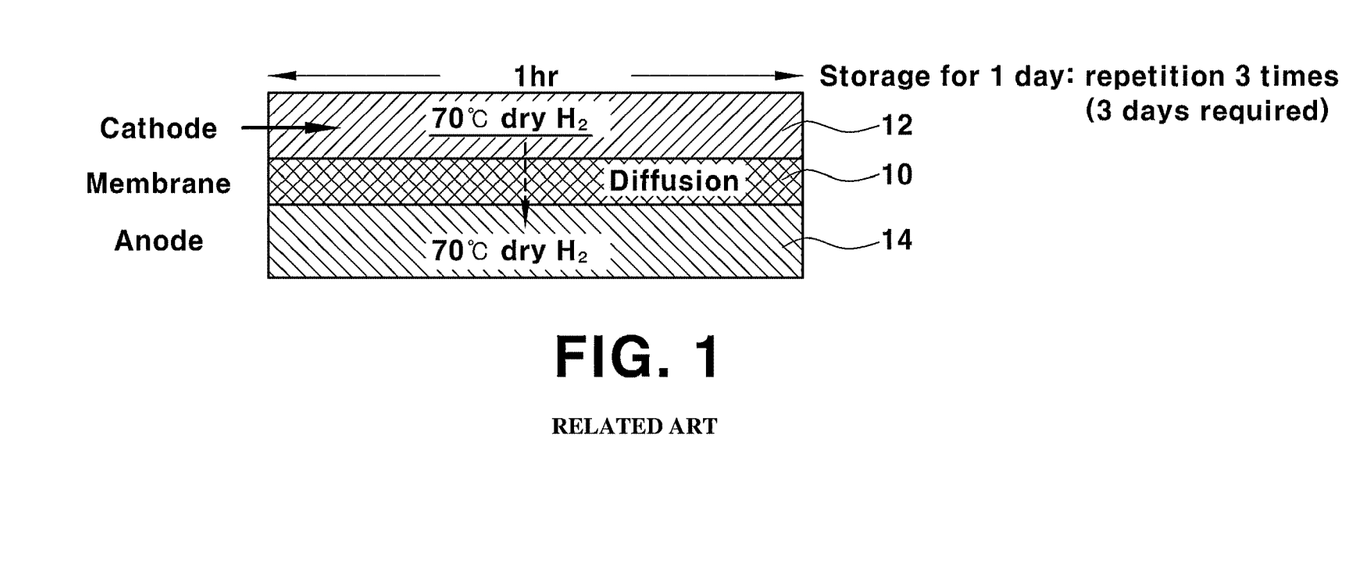
FIG. 1 is an exemplary view of an existing method for recovering the performance of a fuel cell stack according to the related art.

Although not shown in FIG. 1, a gas diffusion layer (GDL), a gasket, etc., are stacked extraneous to the cathode 12 and the anode 14, and a separator is stacked extraneous to the gas diffusion layer. The separator provides flow channels that supply reaction gases, i.e. hydrogen and oxygen (or oxygen-containing air) and allow discharge of water produced from reaction and passage of cooling water. Additionally, an end plate that supports and fixes the outermost unit cell, a connector, etc. are joined outside the cells to complete a fuel cell stack.

At the anode of the fuel cell stack, oxidation of hydrogen occurs as described in the following reaction formula, outputting protons and electrons. The generated protons and electrons move toward the cathode through the polymer electrolyte membrane and the separator, respectively. At the cathode, the protons which moved from the anode react with electrons and oxygen included in air to form water. Electric energy is produced from the fuel cell stack as the electrons travel.

—Electrode Reactions—

Anode: hydrogen oxidation $2H_2 \rightarrow 4H^+ + 4e^-$

Cathode: oxygen reduction $4H^+ + 4e^- + O_2 \rightarrow 2H_2O$

Total: $2H_2 + O_2 \rightarrow 2H_2O$

As the fuel cell stack is operated, deterioration occurs at the polymer electrolyte membrane and the catalytic electrodes (Pt/C), i.e., the cathode and the anode, of the membrane electrode assembly (MEA). As a result, the performance of the fuel cell stack (i.e., stack output) decreases with time. In particular, when an oxide film (e.g., Pt—OH, Pt—O, etc.) is formed on the surface of the platinum (Pt) cathode due to, for example, deterioration, the oxide film interferes with the adsorption of reactive oxygen ($O_2$) on the platinum surface, thus slowing the oxygen reduction reaction (ORR) on the cathode and resulting in decreased stack performance.

Furthermore, Pt cations ($Pt^{z+}$) released from the oxide on the platinum surface during the operation may redeposit on the surface of other platinum particles, leading to increased size of the platinum particles. In addition, corrosion of carbon occurring during the operation results in a weaker binding between platinum and carbon, leading to aggregation of platinum particles of nanometers in size. The increased size of the platinum particles causes decreased catalytic activity. However, the decrease in stack performance caused by chemical change on the surface of the platinum catalyst is recognized as irreversible deterioration and there are few studies or reports on a method for recovering (e.g., rehabilitating) the performance of the membrane electrode assembly.

According to a method of a related application, a procedure of supplying hydrogen to a cathode of a deteriorated fuel cell stack is repeated at least 3 times and the hydrogen is also stored for a predetermined time to remove the oxide formed on the platinum surface of the cathode. In particular, by repeating 3 times a procedure of supplying hydrogen at about 70° C. to a cathode 12 (see FIG. 1) of a deteriorated fuel cell for 1 hour and storing the same for a day, the oxide film (Pt—OH, Pt—O, etc.) formed on the platinum (Pt) surface of the cathode 12 can be removed and, at the same time, mobile platinum ions (mobile $Pt^{z+}$, z=2 or 4) released during the operation of the fuel cell can be redeposited as platinum (Pt) with high activity through recombination with electrons. As a result, the catalytic activity of the cathode can be recovered and, through this, the stack performance can be recovered by about 30-40%.

Since the hydrogen supplied to the cathode 12 for 1 hour is diffused to an anode 14 (indicated by a broken arrow in FIG. 1), hydrogen atmosphere can be created at both electrodes and the catalyst oxide at the cathode can be reduced. However, this method requires an increased recovery time of the performance of the fuel cell and an excessive amount of hydrogen may be supplied to the cathode. For these reasons, it may be difficult to recover the performance of the fuel cell stack without detachment from a fuel cell vehicle.

SUMMARY

The present invention provides a method for recovering the performance of a deteriorated fuel cell stack mounted within a vehicle without detachment of the stack from the vehicle. In particular, the present invention provides a method for recovering the catalytic activity and stack performance of a deteriorated fuel cell stack mounted within a vehicle without detachment of the stack from the vehicle or without structural change in a balance of plant (BOP) of the fuel cell system.

In an aspect, the present invention provides a method for recovering the performance of a fuel cell stack that may include continuously applying a predetermined load using a load device when an air supply is stopped and hydrogen is supplied to a fuel cell stack, to output current from the fuel cell stack, wherein protons and electrons generated by hydrogen oxidation reaction at an anode may be moved to a cathode, to produce hydrogen at the cathode and oxide on the catalyst surface of the cathode may be removed at the same time.

In an exemplary embodiment, a predetermined load may be continuously applied to the fuel cell stack when the air supply is stopped and hydrogen is supplied to the fuel cell stack, to deplete the air within the cathode, and the load recovery process may be performed continuously. In another exemplary embodiment, the recovery process may be performed for a predetermined time and the recovery process may be performed repeatedly. In another exemplary embodiment, while the recovery process is performed repeatedly, the current consumed by the load device may be gradually increased. Further, a load may be applied to the fuel cell stack for about 1 hour during the recovery process, to cause a current of about 3-30 A to be continuously consumed by the load device. Dry hydrogen may be supplied to the fuel cell stack and hydrogen humidified by a humidifier may be supplied to the fuel cell stack.

Other features and aspects of the present invention will be apparent from the following detailed description, drawings and claims.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

DETAILED DESCRIPTION OF MAIN ELEMENTS

10: polymer electrolyte membrane
12: cathode
14: anode

It should be understood that the accompanying drawings are not necessarily to scale, presenting a somewhat simplified representation of various exemplary features illustrative of the basic principles of the invention. The specific design features of the invention as disclosed herein, including, for example, specific dimensions, orientations, locations and shapes, will be determined in part by the particular intended application and use environment.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the accompanying claims.

The present invention provides a method for recovering the performance of a deteriorated fuel cell stack mounted within a vehicle without detachment from the vehicle. In particular, a predetermined load may be continuously applied to a fuel cell stack when air supply is stopped and humidified saturated hydrogen is supplied to the fuel cell stack, thereby inducing hydrogen pumping at a cathode (generation of hydrogen inside the cathode) and thus recovering catalytic activity and stack performance by effectively removing oxide film (Pt—OH, Pt—O, etc.) formed on the surface of a platinum catalyst at the cathode.

In particular, first, a predetermined load may be continuously applied to the fuel cell stack when the air supply is stopped and hydrogen is supplied to the fuel cell stack to remove the oxide film (Pt oxide, e.g., Pt—OH, Pt—O, etc.) formed on the surface of the platinum catalyst at the cathode. In other words, a predetermined load may be continuously applied to the fuel cell stack using a load device when the air supply is stopped and humidified saturated hydrogen is supplied to supply the humidified saturated hydrogen to the anode of the fuel cell stack.

A humidifier that humidifies the hydrogen supplied from a hydrogen storage tank of a vehicle to the fuel cell stack may be used to supply the humidified hydrogen to the fuel cell stack. Although the hydrogen supplied to recover the performance of the stack when the air supply stopped may be dry hydrogen, use of the humidified hydrogen provides higher efficiency than the dry hydrogen. Accordingly, the hydrogen humidified may be supplied by the humidifier rather than the dry hydrogen to the stack.

Since various types of humidifiers for humidifying gas (e.g., reaction gas) including a membrane humidifier are known in the field of fuel cell, a detailed description thereof will be omitted. The humidifier may be provided at a hydrogen supply pipe or a flow channel to humidify the hydrogen. In addition, the load device may be any device mounted within the vehicle that may consume the current from the fuel cell stack. For example, a cathode oxygen depletion (COD) device mounted in a fuel cell system may be used. Accordingly, to remove the oxide formed on the surface of the platinum catalyst of the cathode, a predetermined load may be continuously applied to the fuel cell stack when the air supply of air and humidified saturated hydrogen may be supplied to the anode by withdrawing the current for recovering catalytic activity and stack performance using the load device.

When a load is applied to the fuel cell stack using the load device when the air supply is stopped and the saturated hydrogen is supplied, the air inside the may be is consumed and the cell voltage of the fuel cell stack may be decreased toward 0 V (anode: $2H_2 \rightarrow 4H^+ + 4e^-$/cathode: $4H^+ + 4e^- + O_2 \rightarrow 2H_2O$, oxygen in the cathode may be consumed). Whereas the cell voltage when the fuel gas hydrogen and the oxidizing gas air (oxygen) are supplied to the fuel cell stack is the open-circuit voltage (OCV; theoretically, about 1.23 V), the cell voltage of the fuel cell stack when the supply of the saturated hydrogen to the anode and the supply of the air to the cathode are stopped and a load is applied to the fuel cell stack using the load device may decrease toward 0 V. When the predetermined load is applied continuously after the residual oxygen in the cathode is depleted, the protons and electrons generated at the anode from the hydrogen oxidation reaction move to the cathode and hydrogen production reaction occurs at the cathode (anode: $2H_2 \rightarrow 4H^+ + 4e^-$/cathode: $4H^+ + 4e^- \rightarrow 2H_2$, hydrogen is produced at the cathode).

Furthermore, the load device (e.g., COD device) may continuously consume a current of about 30 A or less for a predetermined time (e.g., recovery time). For example, a load may be applied to the fuel cell stack for a recovery time of about 1 hour, to cause a current of about 3-30 A to be continuously consumed by the load device. When the current applied for recovery is too low (e.g., insufficient), it may be difficult to achieve sufficient stack performance recovery effect and recovery efficiency. Since the recovery efficiency increases with the current, a sufficient current up to about 30 A may be applied.

The recovery efficiency may be improved when humidified hydrogen is supplied during the recovery process of the stack performance as described above. In addition, the performance recovery efficiency may be further improved when cooling water is supplied to a cooling water channel of the stack by operating a stack cooling system during the recovery process. In other words, when cooling water flows along the cooling water channel of the separator by supplying hydrogen at high temperature (e.g., 70° C.) and the cooling water at low temperature (e.g., 15-30° C.) simultaneously, the recovery efficiency may be further improved as water is condensed on the electrode surface (e.g., reaction surface) of the stack.

Figure 3:
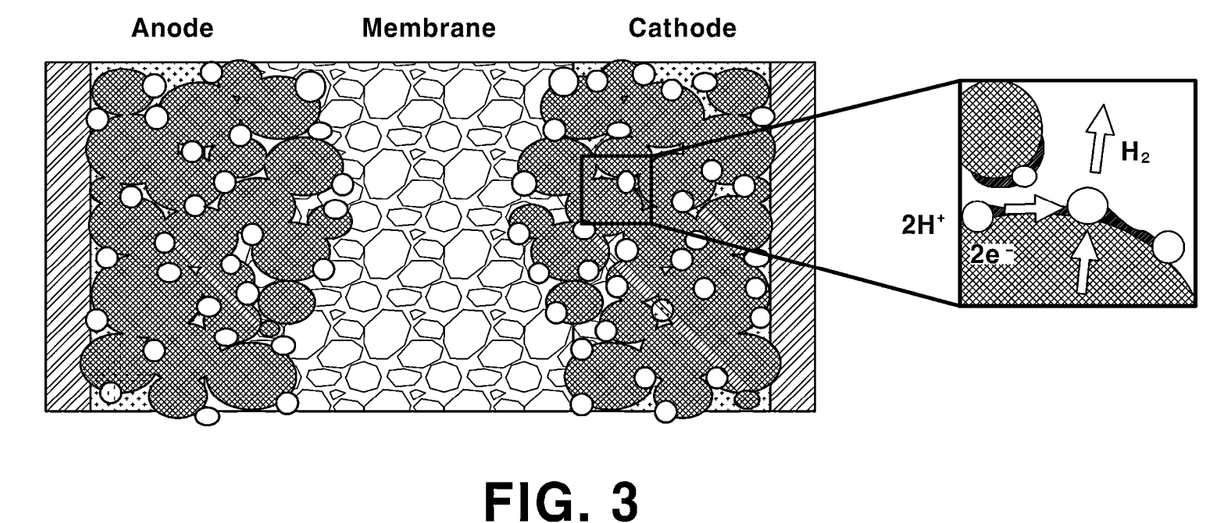
FIG. 3 shows an exemplary hydrogen pumping mechanism at a cathode in a performance recovery process according to an exemplary embodiment of the present invention.

FIG. 3 shows an exemplary hydrogen pumping mechanism at the cathode in the performance recovery process according to an exemplary embodiment of the present invention. FIG. 3 shows that the protons and electrons generated at the anode from the hydrogen oxidation reaction move toward the cathode and hydrogen may be produced at the cathode. In addition, the protons and electrons that moved to the cathode may also be directly involved in the reduction of the oxide (e.g., Pt—O, Pt—OH) formed on the surface of the platinum catalyst at the cathode. As a result, the oxide formed on the surface of the platinum catalyst at the cathode may be removed.

Figure 4:
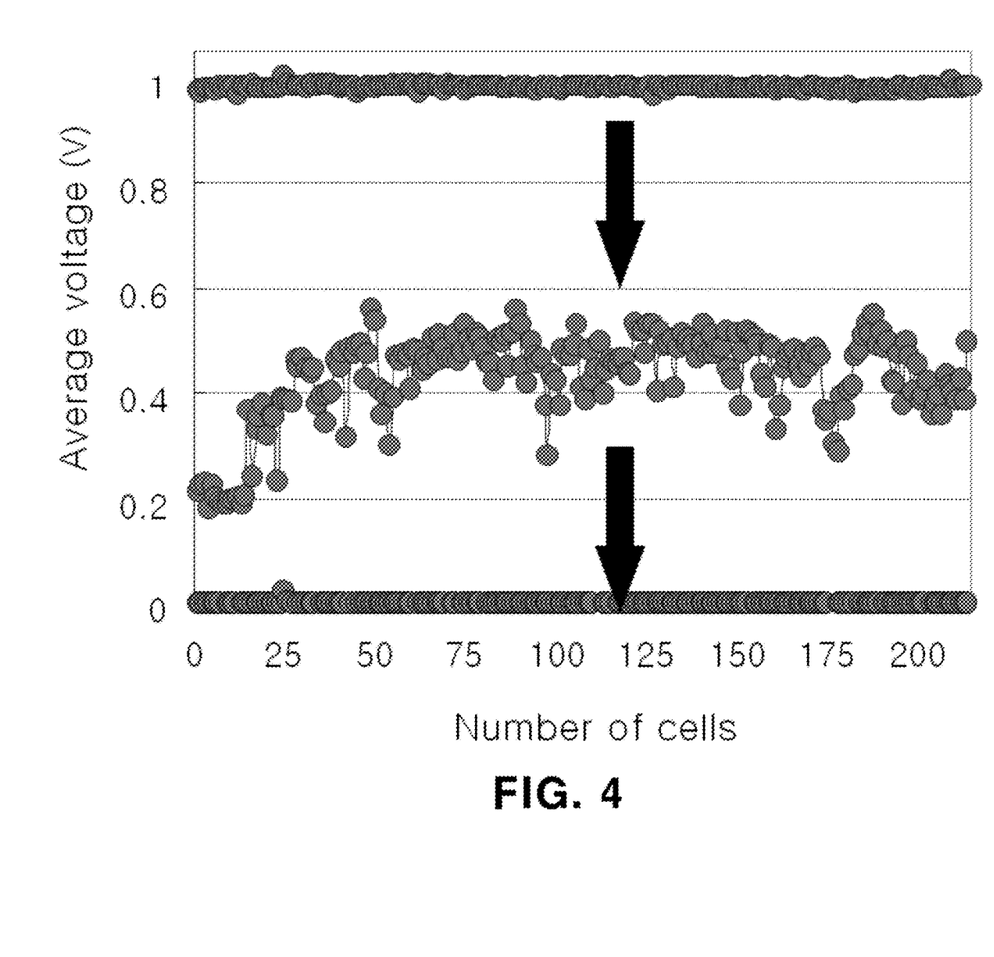
FIG. 4 shows an exemplary cell voltage distribution during a performance recovery process according to an exemplary embodiment of the present invention.

FIG. 4 shows an exemplary distribution of average voltage of each cell of the fuel cell stack during the performance recovery process according to an exemplary embodiment of the present invention. The cell voltage distribution when a recovery current of about 5 A is applied to the load device is shown. FIG. 4 shows that the cell voltage may decrease toward 0 V during the performance recovery process as the load is applied to the stack. The platinum oxide reduction reaction occurring at the cathode during the performance recovery process according to the present invention is as follows.

Further, the electrode reactions, i.e. the hydrogen oxidation reaction at the anode and the hydrogen reduction (e.g., production) reaction at the cathode, during the performance recovery process according to the present invention are as follows.

—Electrode Reactions—

Figure 5:
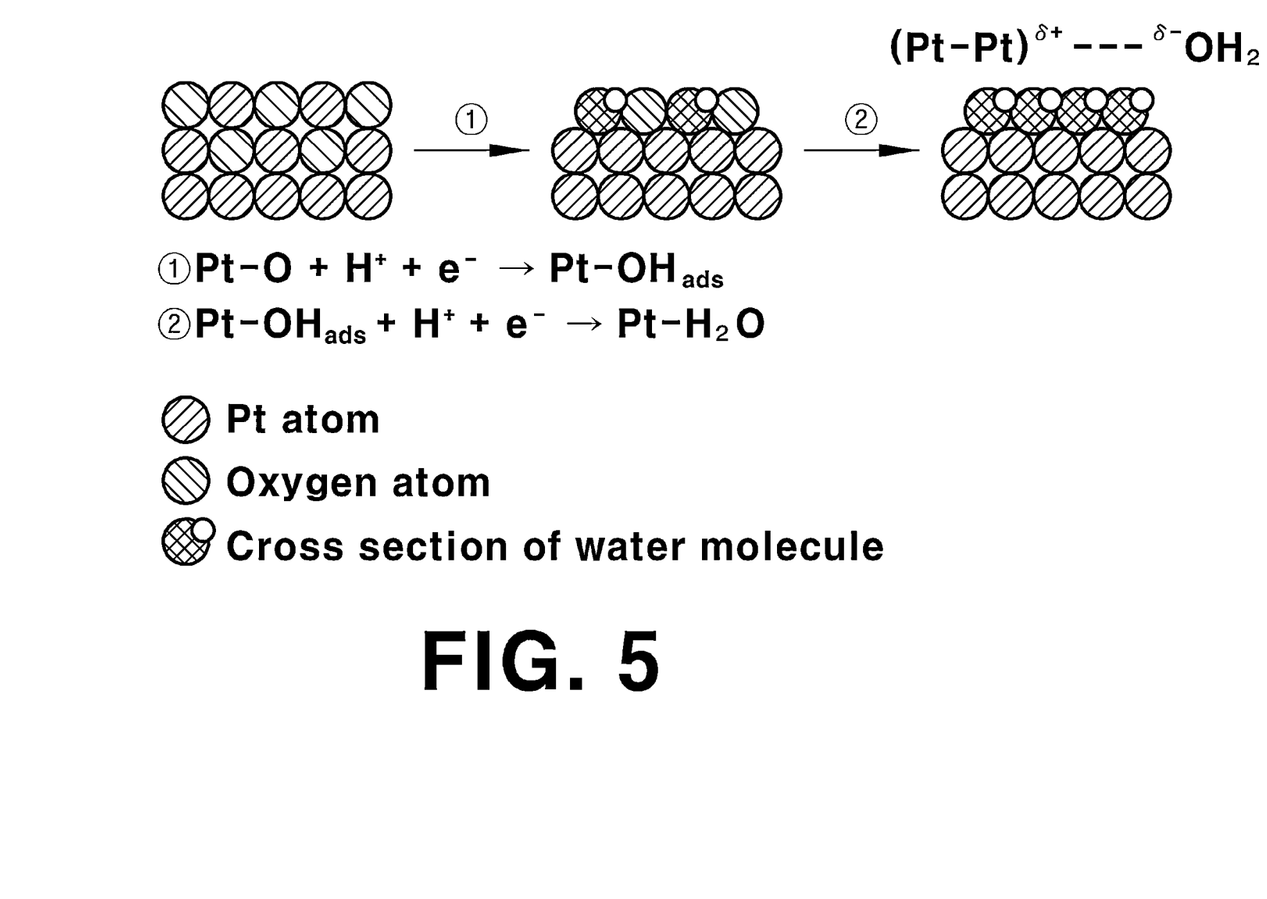
FIG. 5 shows an exemplary catalyst recovery mechanism according to an exemplary embodiment of the present invention.

FIG. 5 describes the catalyst recovery mechanism according to an exemplary embodiment of the present invention. By continuously applying a constant current of about 3-6 A when the air supply to the deteriorated stack mounted within the vehicle is stopped and only hydrogen is supplied, hydrogen may be produced at the cathode ($H_2$ pumping) and the oxide (Pt—O, Pt—OH) formed during the operation of the fuel cell on the surface of the platinum catalyst of the cathode may be removed to improve catalytic activity.

For sufficient recovery of the performance of the deteriorated stack, the performance recovery process (e.g., stopping of air supply, supply of hydrogen and application of load) may be performed repeatedly. When the current consumed by the load device, i.e., the recovery current, is increased gradually while the recovery process is performed repeatedly, the rate of the oxide reduction reaction on the platinum surface of the cathode may increase and thus the recovery efficiency of the performance of the deteriorated stack may be improved. For example, while the recovery process is performed repeatedly, the recovery current may be increased as follows: 3.5 A→4.5 A→5.5 A.

Figure 6:
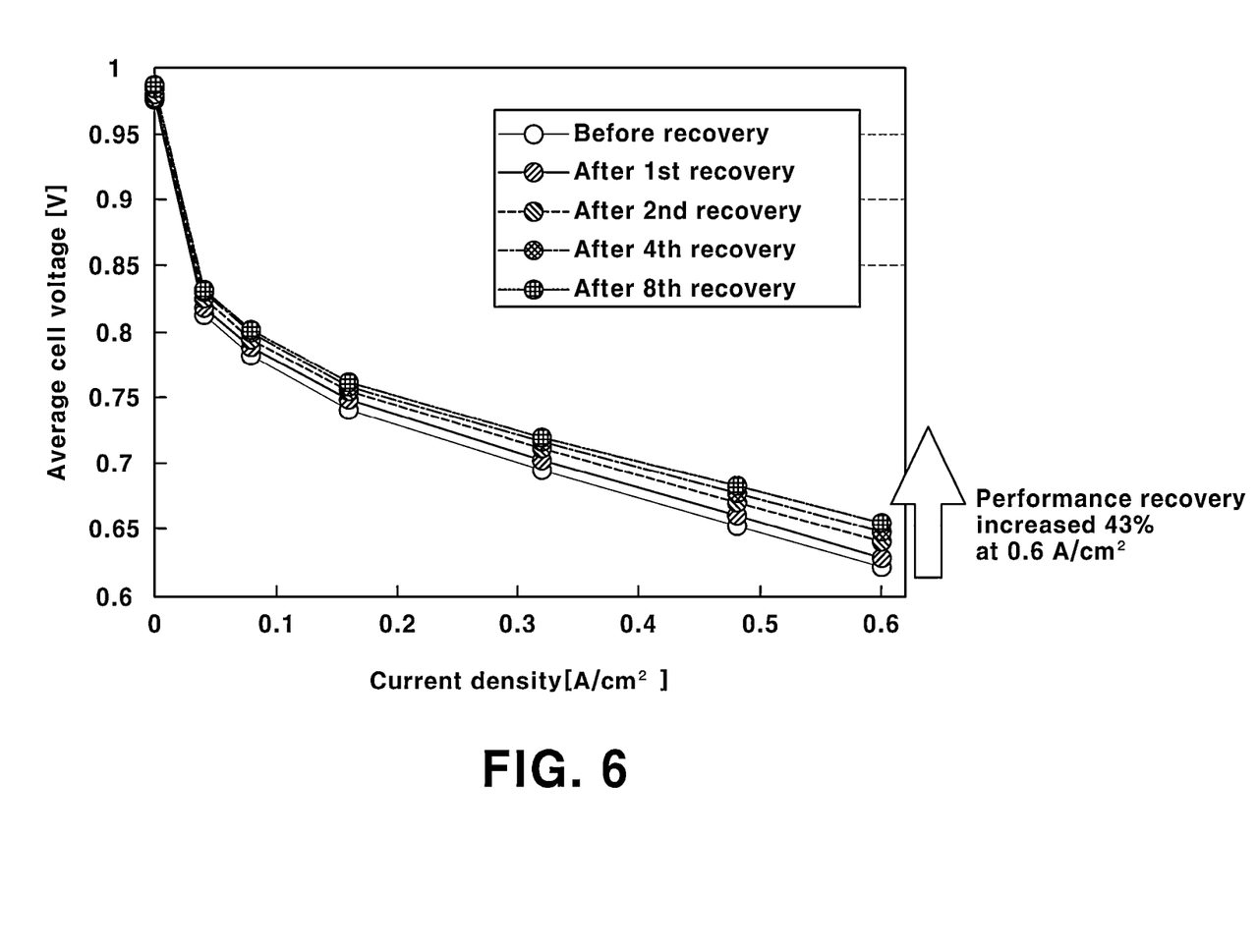
FIG. 6 shows an exemplary recovery of stack performance according to an exemplary embodiment of the present invention.
Figure 7:
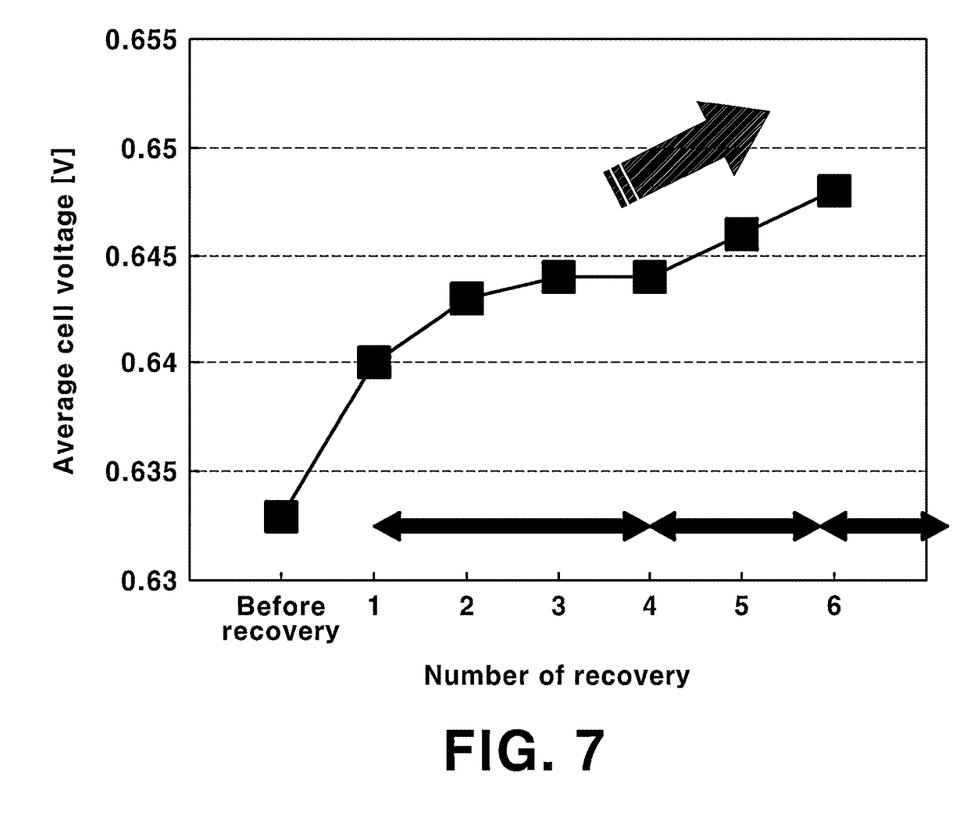
FIG. 7 shows an exemplary effect of recovery current during a performance recovery process according to an exemplary embodiment of the present invention.

FIG. 6 and FIG. 7 show the exemplary recovery of stack performance according to an exemplary embodiment of the present invention. The recovery process was repeated 8 times, and stack current and voltage after 1st, 2nd, 4th and 8th process are shown in FIG. 6. Referring to FIG. 6, the cell voltage (e.g., average voltage of each cell) at the same current density increases gradually as the performance recovery process is repeated. After the 8th recovery process, the cell voltage was increased by approximately 33 mV at a current density of 0.6 A/cm$^2$, thus resulting in 43% of performance recovery compared to the initial performance, suggesting that the performance of the membrane electrode assembly may be recovered through the improvement of catalytic activity.

FIG. 7 shows the exemplary effect of the recovery current during the performance recovery process according to an exemplary embodiment of the present invention. The average cell voltage at a current density of about 0.6 A/cm$^2$ based on the recovery current is shown. Referring to the experimental result shown in FIG. 7, as the stack recovery current was gradually increased from 3.5 A to 4.5 A and to 5.5 A while repeating the performance recovery process, the efficiency of performance recovery was increased gradually.

In the present invention, by applying a load to the stack when the air supply is stopped and hydrogen is supplied to forcibly produce electricity by the stack, the oxygen included in the oxide such as Pt—O in the cathode may be forced to be used, instead of the oxygen included in air. Through the hydrogen pumping at the cathode of the deteriorated stack, the oxide film (e.g., Pt—OH, Pt—O) present on the surface of the platinum catalyst of the cathode may be effectively removed and, in particular, the stack performance can may recovered without detachment of the stack from the fuel cell vehicle. In addition, the durability of the stack may be improved.

As another advantageous effect provided by the method of the present invention, it was experimentally confirmed that, after the performance recovery process, the cell whose degree of deterioration is greater shows larger increase in voltage whereas the cell whose degree of deterioration is less shows less increase in voltage. Accordingly, when the method according to an exemplary embodiment of the present invention is applied for a fuel cell stack consisting of hundreds of unit cells, the difference in performance between cells caused by driving of the vehicle may be reduced (cell performance balancing).

Figure 8:
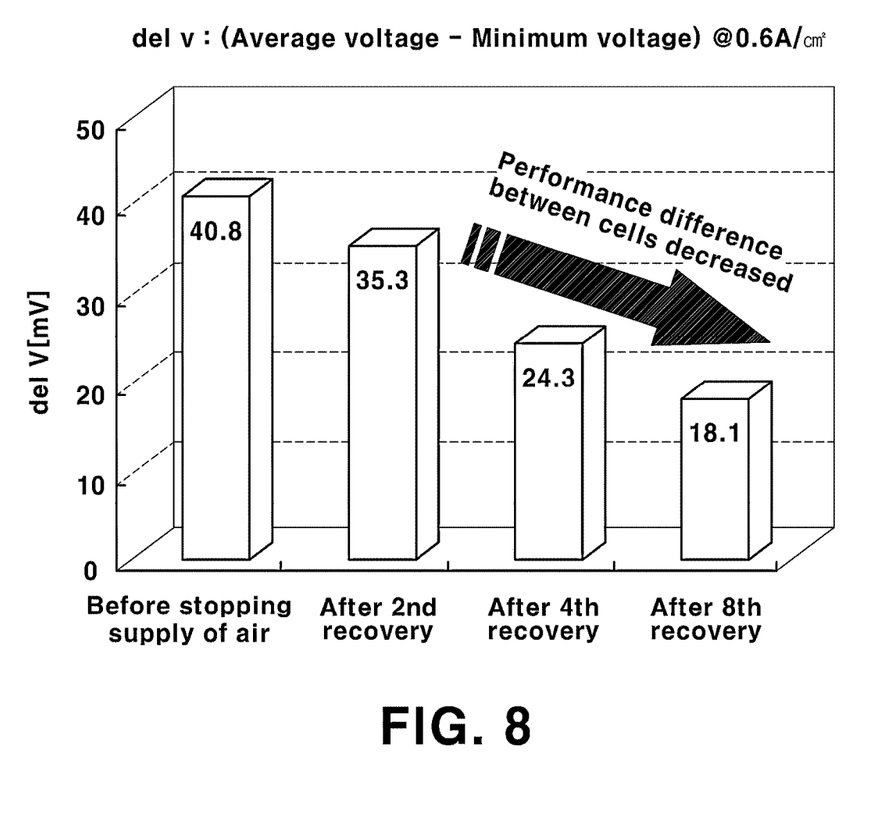
FIG. 8 shows an exemplary decrease in performance difference between cells after a performance recovery process according to an exemplary embodiment of the present invention.

FIG. 8 shows the decrease in performance difference between cells after the performance recovery process according to an exemplary embodiment of the present invention. After the 8th performance recovery process, the standard deviation of cell voltages was decreased by about 19% and del V, i.e., the difference between the average voltage of all the cells and the minimum cell voltage, was decreased by about 55%. Accordingly, when the method of the present invention is applied, the performance of the cell whose degree of deterioration is greater may be recovered relatively more and, as a result, all the cells may exhibit substantially uniform performance.

As another advantageous effect provided by the method of the present invention, water discharge from the fuel cell may be improved after the performance recovery process. The hydrogen produced at the cathode during the performance recovery process may be adsorbed on the surface of the platinum catalyst and then may move to the carbon support near the platinum through surface diffusion ("hydrogen spillover") and the excited protons may reduce carbon oxide near the platinum, to partially recover the hydrophobicity of the carbon surface. When the recovery method of the present invention was applied to a deteriorated stack, water discharge could be improved by about 20%. As a result, flooding in the flow channel of a metal separator may be reduced. Additionally, as the flow channel for air and hydrogen is sufficiently ensured, del V (e.g., the difference between the average voltage of all the cells and the minimum cell voltage) may decrease (i.e., performance difference between cells can be decreased).

Figure 9:
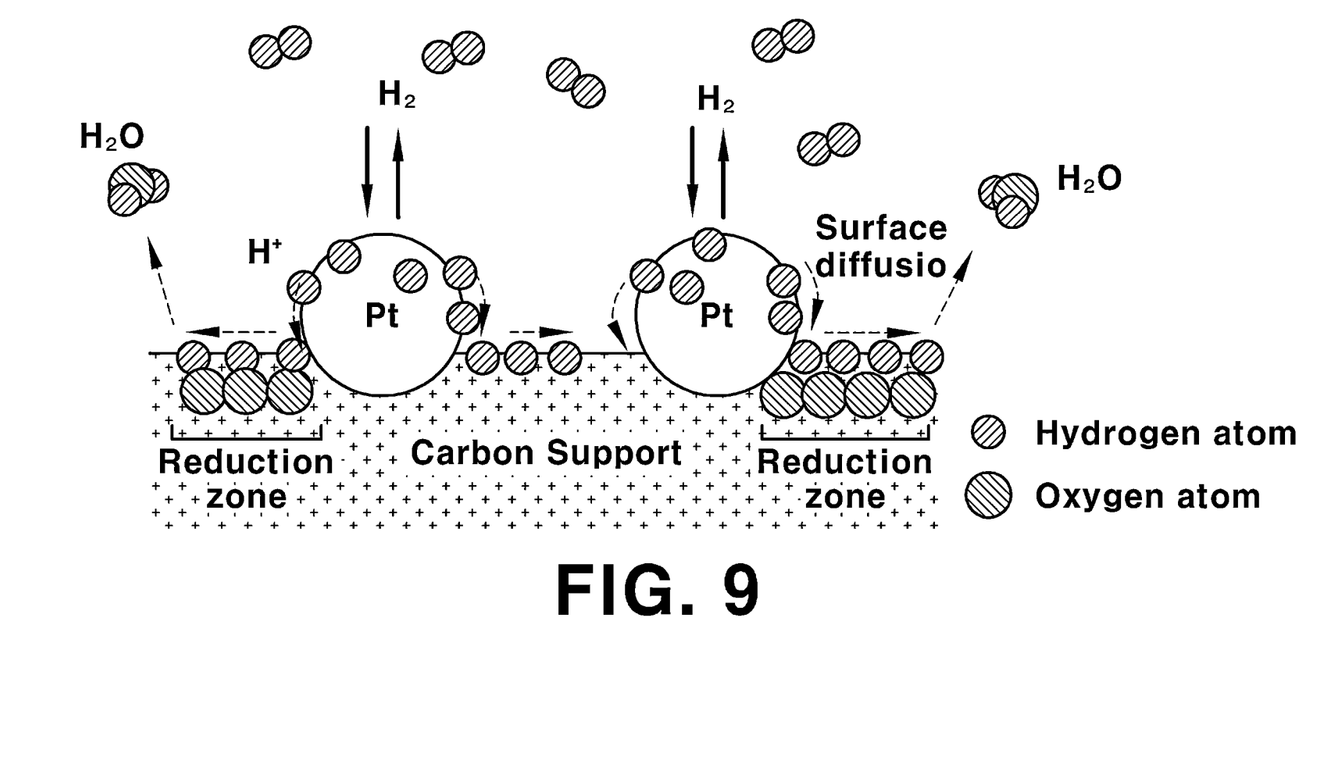
FIG. 9 shows an exemplary mechanism by which carbon oxide around a catalyst is reduced by "hydrogen spillover" according to an exemplary embodiment of the present invention.
Figure 10:
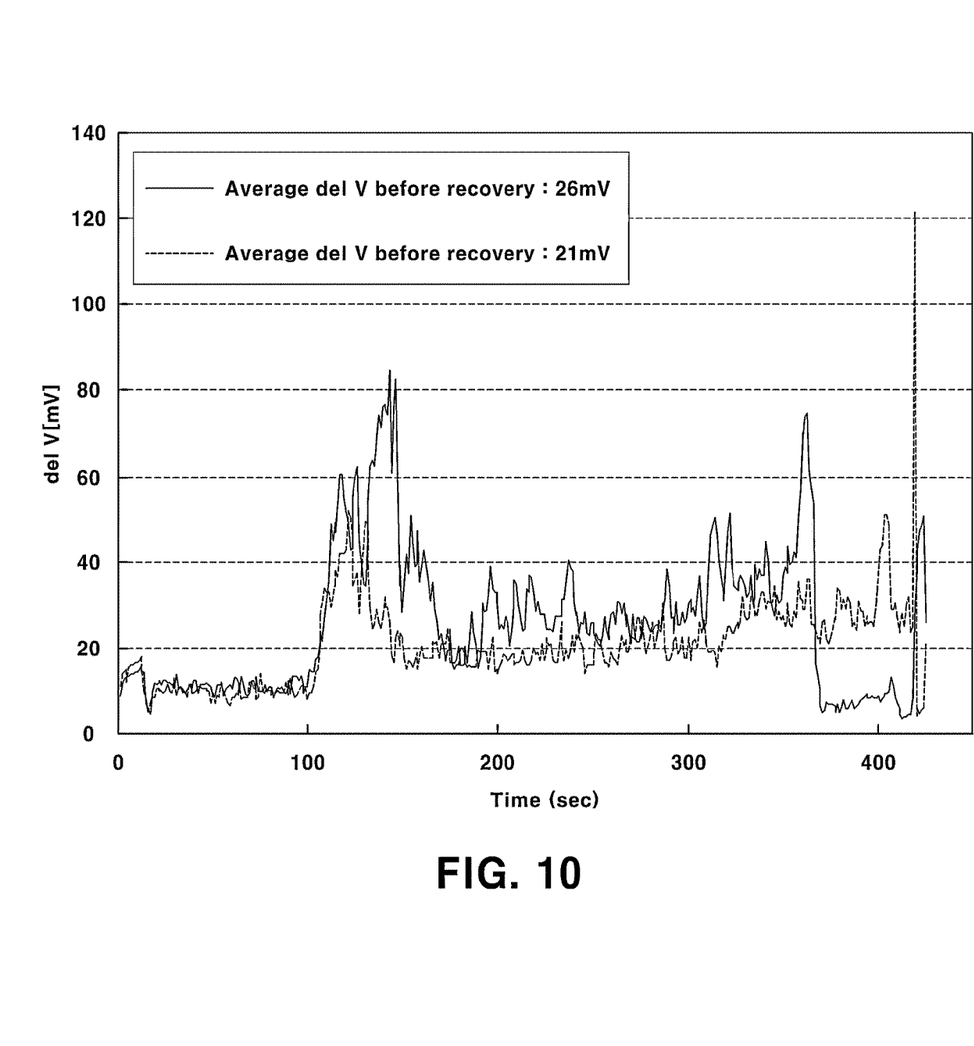
FIG. 10 shows an exemplary decrease in performance difference between cells as a result of improved water discharge according to an exemplary embodiment of the present invention.

FIG. 9 shows the exemplary mechanism by which carbon oxide around the catalyst is reduced by "hydrogen spillover" according to an exemplary embodiment of the present invention, and FIG. 10 shows the exemplary decrease in del V with operation time. As seen from FIG. 9, hydrogen may reduce carbon oxide on the carbon support of the cathode, to recover the hydrophobicity of the carbon support and prevent deterioration of cell performance caused by flooding. Referring to FIG. 10, the difference in performance between cells was decreased after the performance recovery process due to the increased water discharge from the stack (e.g., average del V was decreased after the performance recovery process).

In accordance with an exemplary embodiment of the present invention, the catalytic activity and stack performance of the deteriorated fuel cell stack mounted within the vehicle may be recovered without detachment of the stack from the vehicle or without structural change in the balance of plant (BOP) of the fuel cell system, and the durability of the stack can be enhanced.

As described, in accordance with the method for recovering the stack performance of the present invention, the oxide formed on the catalyst surface of the cathode may be removed by reduction more easily by applying a load to the stack using a load device mounted within the vehicle when the air supply is stopped and humidified saturated hydrogen is supplied. In particular, since the performance of the deteriorated stack may be recovered without detachment of the stack from the fuel cell vehicle and the overall durability of the stack may be improved.

The present invention has been described in detail with reference to exemplary embodiments thereof. However, it will be appreciated by those skilled in the art that various changes and modifications may be made in these embodiments without departing from the principles and spirit of the invention, the scope of which is defined in the accompanying claims and their equivalents.

What is claimed is:

1. A method for recovering the performance of a fuel cell stack, comprising:
   a recovery process in which an air supply is stopped and residual oxygen in a cathode is removed, then a predetermined load using a load device is continuously applied, the recovery process further being carried out while hydrogen is supplied to a fuel cell stack, so as to output current from the fuel cell stack,
   wherein protons and electrons generated by a hydrogen oxidation reaction at an anode are moved to the cathode, to produce hydrogen at the cathode and simultaneously remove oxide on a catalyst surface of the cathode by reduction on the catalyst surface of the cathode.

2. The method according to claim 1, wherein the predetermined load is continuously applied to the fuel cell stack when the air supply is stopped and hydrogen is supplied to the fuel cell stack, to deplete the air inside the cathode, and the load recovery process is performed continuously.

3. The method according to claim 1, wherein the recovery process is performed for a predetermined time and the recovery process is performed repeatedly.

4. The method according to claim 3, wherein, while the recovery process is performed repeatedly, the current consumed by the load device is constantly maintained at each said recovery process, and the current consumed by the load device is increased in accordance with repetition of the recovery process.

5. The method according to claim 4, wherein the predetermined load is applied to the fuel cell stack for about 1 hour during each said recovery process, to cause a current of about 3-30 A to be continuously consumed by the load device.

6. The method according to claim 1, wherein the hydrogen supplied to the fuel cell stack is humidified by a humidifier.

7. The method according to claim 6, wherein cooling water flows along a cooling water channel of the stack while the hydrogen is supplied to condense water on an electrode surface of the stack.

8. The method according to claim 1, wherein the hydrogen supplied to the fuel cell stack is dry hydrogen.

* * * * *